(12) United States Patent
Li et al.

(10) Patent No.: US 12,411,044 B2
(45) Date of Patent: Sep. 9, 2025

(54) EARPHONE

(71) Applicant: Harman International Industries, Incorporated, Stamford, CT (US)

(72) Inventors: Endong Li, Guangdong (CN); Tieyi Liang, Guangdong (CN); Jinhua Zou, Guangdong (CN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 123 days.

(21) Appl. No.: 18/548,201

(22) PCT Filed: Apr. 9, 2021

(86) PCT No.: PCT/CN2021/086101
§ 371 (c)(1),
(2) Date: Aug. 28, 2023

(87) PCT Pub. No.: WO2022/213346
PCT Pub. Date: Oct. 13, 2022

(65) Prior Publication Data
US 2024/0142309 A1   May 2, 2024

(51) Int. Cl.
| | | |
|---|---|---|
| *G01J 5/00* | (2022.01) | |
| *G01J 5/04* | (2006.01) | |
(Continued)

(52) U.S. Cl.
CPC ............. *G01J 5/0011* (2013.01); *G01J 5/049* (2013.01); *G01J 5/0802* (2022.01);
(Continued)

(58) Field of Classification Search
CPC ........ G01J 5/0011; G01J 5/049; G01J 5/0802; H04R 1/1016
(Continued)

(56) References Cited

U.S. PATENT DOCUMENTS

| | | |
|---|---|---|
| 2014/0288395 A1 | 9/2014 | LeBoeuf et al. |
| 2015/0092952 A1 | 4/2015 | Sudo et al. |

(Continued)

FOREIGN PATENT DOCUMENTS

| | | |
|---|---|---|
| CN | 106551682 A | 4/2017 |
| CN | 111895930 A | 11/2020 |

(Continued)

OTHER PUBLICATIONS

ISA National Intellectual Property Administration of the People's Republic of China, International Search Report Issued in Application No. PCT/CN2021/086101, Jan. 10, 2022, WIPO, 2 pages.

(Continued)

*Primary Examiner* — Thjuan K Addy
(74) *Attorney, Agent, or Firm* — McCoy Russell LLP

(57) ABSTRACT

An earphone comprises a housing defining an audio opening; a speaker driver positioned within the housing; and a body temperature measuring module. The audio opening is configured to be positioned within or facing toward an ear canal of a wearer in a wearing position of the earphone. The speaker driver comprises a diaphragm facing toward the audio opening, defining an audio channel between the diaphragm and the opening. The body temperature measuring module is positioned within the audio channel, the and comprises a reflector, and a temperature sensor configured to receive an infrared light transmitted through the audio opening and reflected by the reflector.

20 Claims, 6 Drawing Sheets

(51) Int. Cl.
  *G01J 5/0802* (2022.01)
  *G01J 5/0808* (2022.01)
  *H04R 1/10* (2006.01)

(52) U.S. Cl.
  CPC .......... *G01J 5/0808* (2022.01); *H04R 1/1016* (2013.01); *H04R 1/1075* (2013.01)

(58) Field of Classification Search
  USPC .................................. 381/74, 312, 322, 328
  See application file for complete search history.

(56) References Cited

U.S. PATENT DOCUMENTS

| 2017/0099537 A1* | 4/2017 | Ushakov | ............. H04R 1/1016 |
| 2017/0258329 A1 | 9/2017 | Marsh | |

FOREIGN PATENT DOCUMENTS

| JP | S63157628 U | 10/1988 |
| JP | 2001057696 A | 2/2001 |
| JP | 2002224050 A | 8/2002 |
| JP | 2008136556 A | 6/2008 |
| JP | 2015070514 A | 4/2015 |
| JP | 2018504157 A | 2/2018 |
| JP | 6435526 B2 | 12/2018 |

OTHER PUBLICATIONS

European Patent Office, Extended European Search Report Issued in Application No. 21935575.7, Nov. 21, 2024, Germany, 8 pages.
Japanese Patent Office, Office Action Issued in Application No. 2023-553580, Mar. 27, 2025, 12 pages.

* cited by examiner

EARPHONE

CROSS-REFERENCE TO RELATED APPLICATIONS

The present application is a U.S. National Phase of International Application No. PCT/CN2021/086101, entitled "EARPHONE", and filed on Apr. 9, 2021. The entire contents of the above-listed application are hereby incorporated by reference for all purposes.

TECHNICAL FIELD

This disclosure relates in general to an earphone, and particularly to an earphone that can measure and/or monitor a body (tympanic) temperature of a wearer of the earphone, and more particularly to an in-ear earphone that can measure and/or monitor the body (tympanic) temperature of the wearer.

BACKGROUND ART

In recent years, people are paying more and more attention to body temperature measurement due to various reasons, such as Covid-19. There are many kinds of thermometers, such as an ear thermometer. However, there are still some inconveniences in connection with these thermometers. For example, these thermometers are not sufficiently portable and/or people don't usually carry a thermometer with them and thus cannot find one when needed.

Earphones, such as in-ear earphones, semi-in-ear earphones, or TWS earphones, have become more and more popular and are often carried by people in daily lives in recent years. There have been some attempts to incorporate a body temperature measurement module into such earphones. However, due to the limited space in these earphones, there have been difficulties in integrating the body temperature measurement module into the earphones without substantially block the audio channel, which will result in a deteriorated audio performance.

There is a need for an earphones with a body temperature measurement module that has an improved audio performance.

SUMMARY OF THE INVENTION

According to one aspect of the disclosure, an earphone is provided, comprising: a housing defining an audio opening, the audio opening is configured to be positioned within or facing toward an ear canal of a wearer in an wearing position of the earphone; a speaker driver positioned within the housing, the speaker driver comprising a diaphragm facing toward the audio opening, defining an audio channel between the diaphragm and the opening; a body temperature measuring module positioned within the audio channel, the body temperature measuring module comprising a reflector and a temperature sensor, the temperature sensor is configured to receive an infrared light transmitted through the audio opening and reflected by the reflector.

According to one or more embodiments of the present disclosure, the body temperature measuring module further comprises an optical filter at or near the audio opening.

According to one or more embodiments of the present disclosure, the optical filter is configured to allow IR light of selected wavelength to pass through while substantially absorbs light of other wavelength.

According to one or more embodiments of the present disclosure, the reflector comprises a shaped inner surface of the housing and a coating applied to the shaped inner surface.

According to one or more embodiments of the present disclosure, the coating is a silver coating.

According to one or more embodiments of the present disclosure, the shaped inner surface and the coating is of a curved surface and is configured to reflect and converge the infrared light onto the temperature sensor.

According to one or more embodiments of the present disclosure, the temperature sensor is an FIR sensor.

According to one or more embodiments of the present disclosure, the temperature sensor is arranged in a horizontal orientation in which the photo surface of the temperature sensor is substantially parallel to an axis of the audio channel.

According to one or more embodiments of the present disclosure, the temperature sensor is mounted on a flexible PCB.

According to one or more embodiments of the present disclosure, the temperature sensor is a single chip FIR sensor.

According to one or more embodiments of the present disclosure, the earphone is an in-ear earphone or TWS earphone.

Others systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

BRIEF DESCRIPTION OF THE PREFERRED EMBODIMENTS

Figure 1:
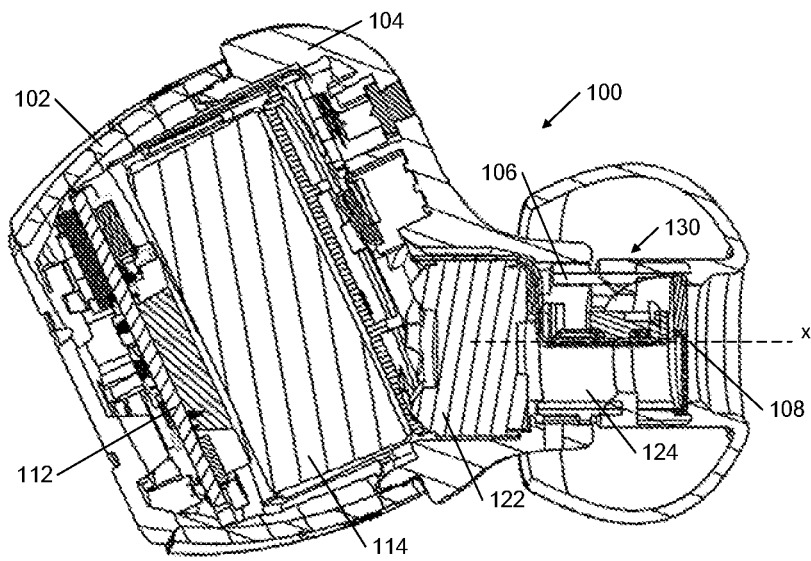
FIG. 1 shows a sectional view of an earphone 100 according to one or more embodiments of the present disclosure.

Hereinafter, the preferred embodiments of the present disclosure will be described in more detail with reference to the accompanying drawings.

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various elements, components, steps or calculations, these elements, components, steps or calculations should not be limited by these terms, rather these terms are only used to distinguish one element, component, step or calculation from another. For example, a first component could be termed a second component, similarly a first calculation could be termed a second calculation; similarly a first step could be termed a second step; all without departing from the scope of this disclosure.

As used herein, the term "audio channel" refers to a channel defined by a housing of an earphone that is between a speaker drive and an audio opening of the earphone, such as between a diaphragm of the speaker driver and the audio opening of the earphone. The term "effective audio channel" refers to an unobstructed portion of the audio channel after a portion of the audio channel has been occupied by a body temperature measuring module. The term "wearing position" refer to a position of the earphone when the earphone is worn by a wearer. The term "audio opening" refer to an opening of the housing of the earphone through which the sound produced by the earphone or speaker driver is transmitted to the ear of the wearer. The audio opening of the earphone is normally positioned within and/or facing toward an ear canal of the wearer in the wearing position of the earphone, i.e., when the earphone is worn by a wearer. The audio opening is normally provided with a mesh which allows the sound produced by the earphone or speaker driver to pass through while preventing dusts or debris from entering the audio channel of the earphone.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

In a wearing position of an earphone, such as an in-ear earphone or a TWS earphone, that is, when the earphone is worn by a wearer, an audio channel of the earphone may be partially positioned in the ear canal of the wearer. Thus, the audio channel of an earphone may normally have a relative small diameter so that earphone can be partially positioned in the ear canal of a wearer. For example, some in-ear earphones or TWS earphones have an audio channel with a diameter of about 4 millimeters to 5 millimeters.

A FIR (Far-Infra-Red) sensor has a photo surface (the side of the FIR sensor that has a sensor element mounted thereon) for receiving FIR light, which normally has a relatively large area, as compared to other sides of the sensor. In order to use a FIR (Far-Infra-Red) sensor to measure an ear temperature, the FIR sensor normally need to be positioned in an vertical orientation in which the large photo surface of the FIR sensor is facing an ear canal or a tympan of the wearer, so that the photo surface can receive FIR light from the ear canal or the tympan of the wearer. However, due to the small diameter of the audio channel of the earphone, a FIR sensor that is positioned in the audio channel in a vertical orientation may substantially block the audio channel, leaving a small portion of the audio channel unobstructed, i.e., a small effective audio channel, which results in a poor audio performance of the earphone.

The present disclosure provides an earphone. The earphone comprises a body temperature measuring module positioned within an audio channel of the earphone. The audio channel is defined between a speaker driver and the audio opening of the earphone. The body temperature measuring module comprising a reflector and a temperature sensor, the temperature sensor is configured to receive an infrared light transmitted through the audio opening and reflected by the reflector.

By providing a reflector in the audio channel of the earphone, the incoming the infrared light can be reflected and redirected to the temperature sensor. Thus the temperature sensor may able to be arranged in a different orientation other than the vertical orientation. That is, the temperature sensor may be arranged in an orientation in which the photo surface of the temperature is not facing an ear canal or a tympan of the wearer. For example, the temperature sensor may be arranged in a horizontal orientation in which the photo surface is substantially parallel to an axis x of the audio channel. In the horizontal orientation, the portion of the audio channel that is obstructed by the temperature sensor is greatly reduced, leaving a relatively large effective audio channel, which results in an improved audio performance, as compared to an earphone having a temperature sensor arranged in a vertical orientation.

In one or more embodiments of the present disclosure, the reflector is shaped and positioned relative to the temperature sensor so that the IR light reaching the reflector is reflected and converged to the temperature sensor, resulting an improved sensitivity and accuracy of the temperature measurement.

FIG. 1 shows a sectional view of an earphone 100 according to one or more embodiments of the present disclosure. As shown in FIG. 1, the earphone 100 comprises a housing which consists of a rear housing 102, a front housing 104 and an ear tube 106. The rear housing 102 and the front housing 104 are connected together, defining an interior chamber for receiving elements and components of the earphone 100 therein. The ear tube 106 is connected to the front housing 104 and protrudes forward from the front housing 104, defining an opening 108 of the earphone 100, which function as an audio opening of the earphone 100. The earphone 100 further comprises a main PCT 112, a battery 114 and a speaker driver 122 provided in the interior chamber defined by the rear housing 102 and the front housing 104. The main PCB 112 has various electronic elements, such as a MCU, mounted thereon. The speaker driver 122 comprises a diaphragm (not shown). The front housing 104 and the ear tube 106 define an audio channel 124 between speaker driver 122 (the diaphragm of the speaker driver) and the opening 108. The earphone 100 further comprises a body temperature measuring module 130 positioned in the audio channel 124.

Figure 2A:
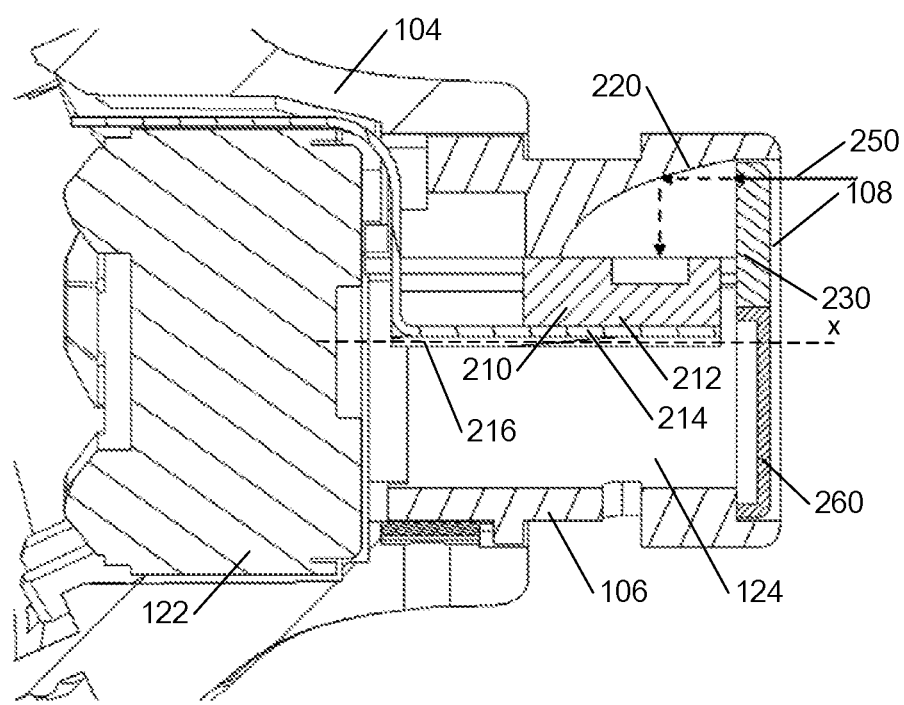
FIG. 2A is an enlarged view of FIG. 1, showing a portion of the earphone.

FIG. 2A is an enlarged view of FIG. 1, showing a portion of the earphone 100. As shown in FIG. 2A, the body temperature measuring module 130 comprises a FIR sensor assembly 210, a reflector 220 and an optical filter 230. The optical filter 230 is positioned side by side with a mesh 260, and the optical filter 230 and the mesh together cover the opening 108 of the ear tube 220, i.e., the audio opening of the earphone. When the earphone is worn by a wearer, the FIR light 250 from the ear canal or tympan of the wearer may pass through the optical filter 230 and reach the reflector 220. The optical filter 230 allows IR light of selected wavelength to pass through while substantially absorbs light of other wavelength. The FIR light 250 is reflected and redirected by the reflector 220 to a FIR sensor 212 of the FIR sensor assembly. In one or more embodiments of the present disclosure, the reflector 220 is a reflecting coating applied to an inner surface of the ear tube 106. As shown, the FIR sensor 212 is in a horizontal orientation with its photo surface facing upward. The FIR sensor assembly 210 is supported on a support plate 216. The support plate 216 divides the audio channel 124 into an upper portion and a lower portion, with the upper portion for accommodating the FIR sensor assembly 210 and the lower portion being an unobstructed portion of the audio channel, i.e., the effective audio channel.

Figure 2B:
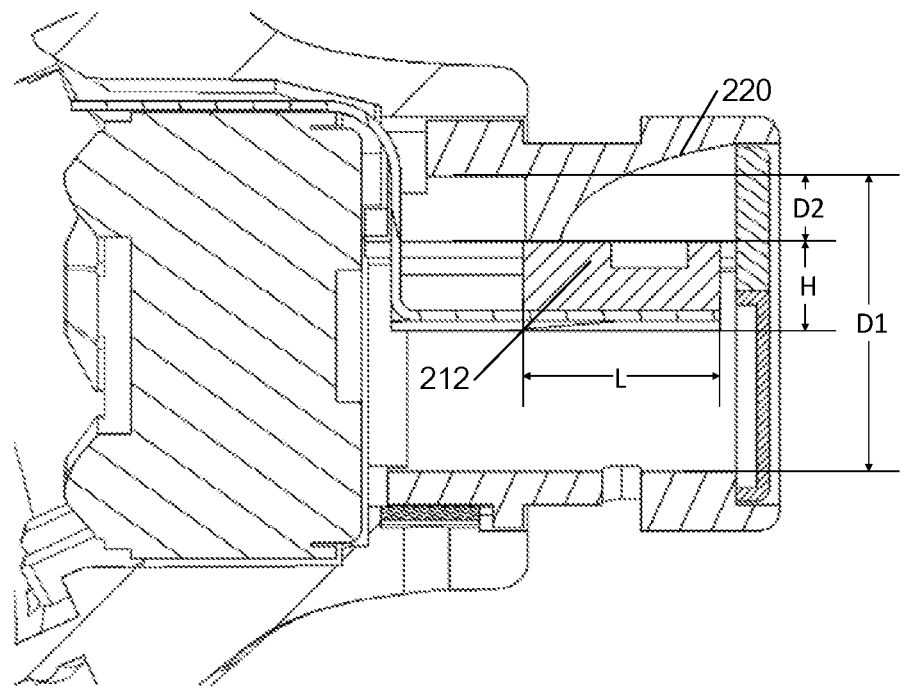
FIG. 2B is a view similar to FIG. 2A, showing some key dimensions of the earphone according to one or more embodiments of the present disclosure.
Figure 2C:
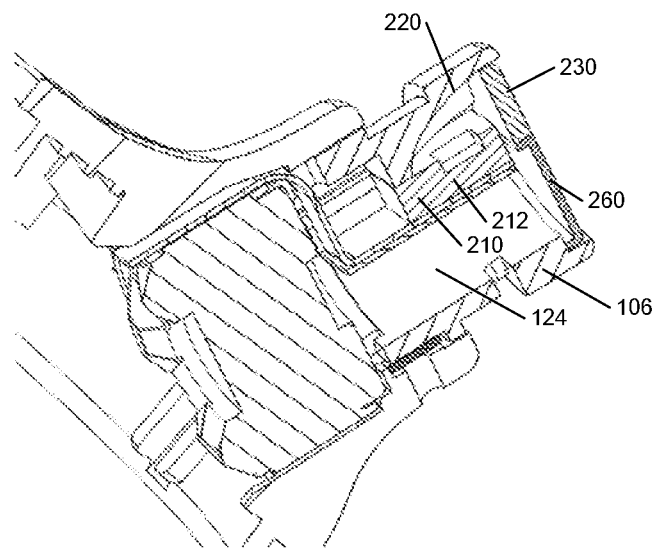
FIG. 2C shows another sectional view of the earphone according to one or more embodiments of the present disclosure.

FIG. 2B is a view similar to FIG. 2A, showing some key dimensions of the earphone 100 according to one or more embodiments of the present disclosure. FIG. 2C shows another sectional view of the earphone 100. As shown in FIG. 2B, the FIR sensor assembly 210 (the FIR sensor 212, the flexible PCB 214 and the support plate 216) has an overall height of H. The FIR sensor 212 has a length of L, and the upper surface (photo surface) of the FIR sensor 212 is spaced from the top of the inner surface of the audio channel by a distance of D2. The entire audio channel has an overall height (diameter) of D1. According to one or more embodiments of the present disclosure, H is about 1.35 mm; D1 is about 4.5 mm; D2 is about 1.20 mm and L is about 3.7 mm. In the horizontal orientation of the FIR sensor 212 shown in FIG. 2B, the body temperature measuring module 130 has an overall height of about 2.55 mm (D2+H). As a comparison, if the FIR sensor 212 is positioned in a vertical orientation, the overall height of the FIR sensor 212 would be the dimension of L, i.e., about 3.7 mm. Thus, by providing a reflector and arranging the FIR sensor 212 in a horizontal orientation, the overall height of the FIR sensor assembly can be reduced from about 3.7 mm to about 2.55 mm, i.e., reduced by a factor of one-third. As shown in FIG. 2A, 2B, by the arrangement of the present disclosure, the earphone 100 can achieve a relatively large effective audio channel, resulting in an improved audio performance of the earphone 100.

Figure 3A:
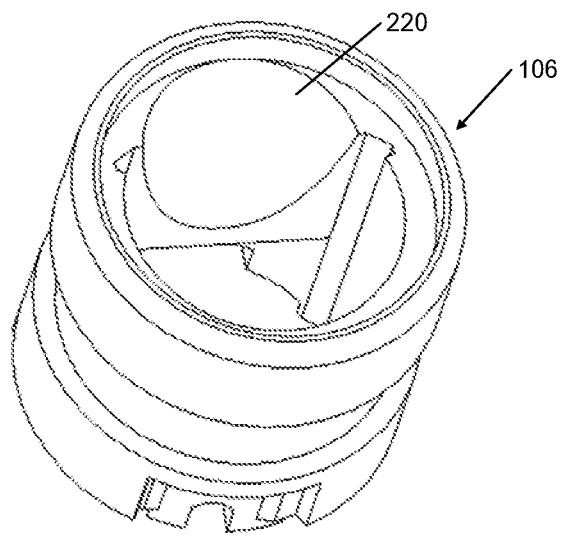
FIG. 3A-3C shows an ear tube according to one or more embodiments of the present disclosure.
Figure 3B:
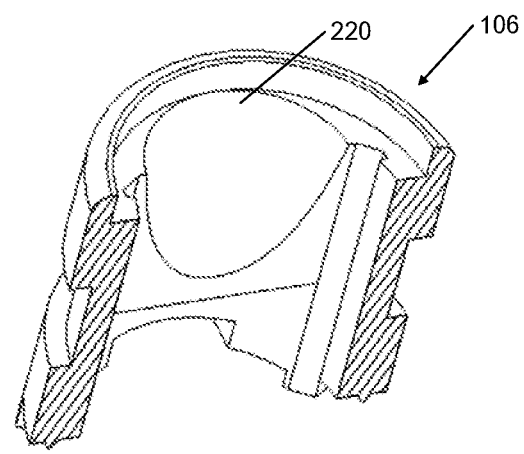
Figure 3C:
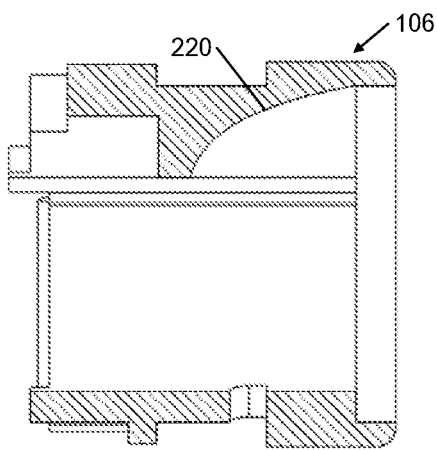

FIG. 3A-3C shows an ear tube 106 according to one or more embodiments of the present disclosure. The reflector 220 comprises a shaped inner surface of the ear tube 106 and a reflecting coating applied to the inner surface. As shown in FIG. 2A, 3A-3C, the shaped inner surface is a curved surface. The inner surface is shaped and positioned relative to the FIR sensor 212 so that the reflecting coating applied to the inner surface may reflect and redirect the incoming FIR light to a sensor element of the FIR sensor 212. In one or more embodiments of the present disclosure, the inner surface is shaped and positioned relative to the FIR sensor 212 so that substantially all of the FIR light reaching the reflecting coating will be reflected and redirected the incoming FIR light to a sensor element of the FIR sensor 212. The area of the reflecting coating may be much larger than that of the sensor element of the FIR sensor 212, and thus the FIR light reaching the reflecting coating is reflected and converged to the FIR sensor, resulting an improved sensitivity and accuracy of the FIR sensor 212.

In some one or more embodiments of the present disclosure, the reflecting coating is a silver coating, which has a high reflection coefficient for reflecting an incoming FIR light to the FIR sensor 212. In other embodiments of the present disclosure, the reflecting coating may be any kind of suitable coating, as long as it can reflect the incoming FIR light to the FIR sensor 212.

Figure 4A:
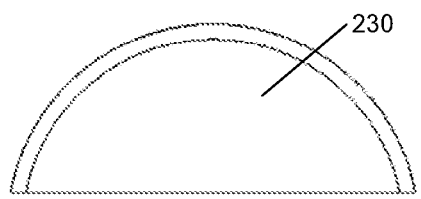
FIG. 4A-4B shows a optical filter according to one or more embodiments of the present disclosure.
Figure 4B:
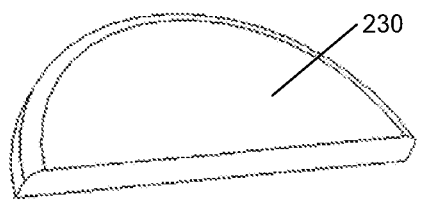

FIG. 4A-4B shows an optical filter 230 according to one or more embodiments of the present disclosure. As shown, the optical filter 230 basically covers the upper portion of the audio opening while the mesh 260 basically covers the lower portion of the audio opening. In one or more embodiments of the present disclosure, the optical filter 230 may be made of any suitable material that allows IR light of selected wavelength to pass through while substantially absorbs light of other wavelength.

Figure 5A:
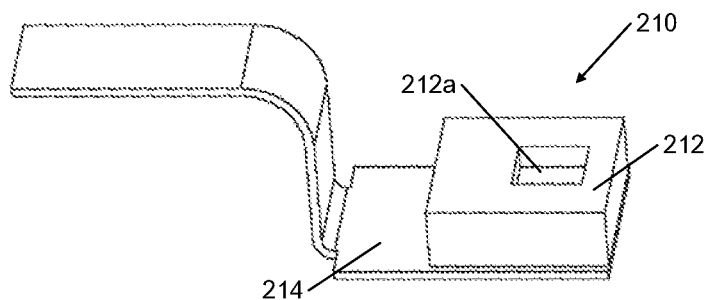
FIG. 5A-5B shows an FIR sensor assembly according to one or more embodiments of the present disclosure.
Figure 5B:
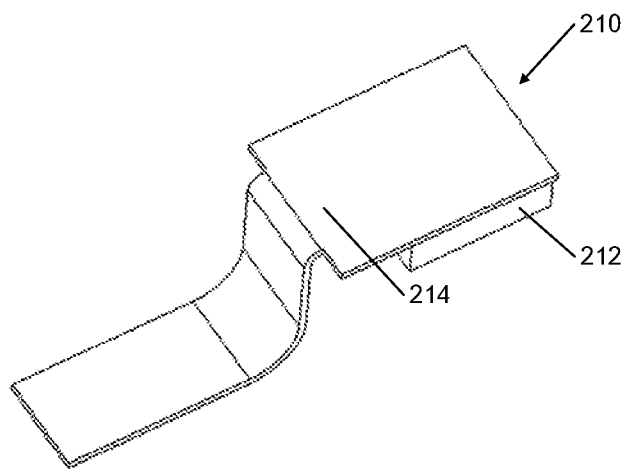

FIG. 5A-5B shows a FIR sensor assembly 210 according to one or more embodiments of the present disclosure. The FIR sensor assembly 210 comprises a flexible PCB 214 and a FIR sensor 212 mounted on the flexible PCB 214. The FIR sensor 212 comprises sensor element 212a for receiving and detecting a FIR light. The FIR sensor may be a single chip FIR sensor with very low power consumption during standby mode (<2 uA) and working mode. Thus, as compared to an earphone without a body temperature measuring module, the earphone of the present disclosure can provide body temperature measurement or monitoring without substantially reducing the play time of the earphone. The flexible PCB 214 contains electrical circuits that electrically connect the FIR sensor 212 to the main PCB 112, such as the MCU mounted on the main PCT 112.

In the wearing position of the earphone 100, i.e., when the earphone is worn by a wearer, the IR or FIR light from an ear canal or tympan of the wearer may pass through the optical filter 230 and reach the reflector 220. The FIR or IR light may be reflected, redirected and converged to a sensor element in the FIR or IR sensor 212. The FIR or IR sensor 212 produces an electrical signal in response to the received FIR or IR light. The electrical signal produced by the sensor 212 is transmitted to an MCU mounted on the main PCB 112 via an electric circuit in the flexible PCB 214. After the MCU receives the electrical signal from the FIR or IR sensor, it will make calculation and algorithm calibration, and determines a body temperature, an ear temperature or a tympanic temperature.

Figure 6:
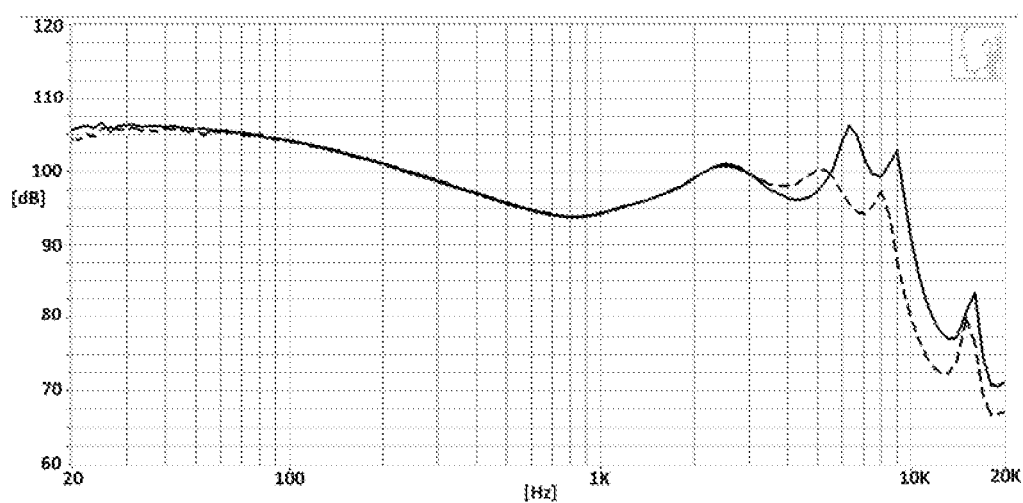
FIG. 6 shows a frequency response curve chart, wherein the solid line is a frequency response curve of an earphone according to one or more embodiments of the present disclosure that comprises an FIR sensor arranged in a horizontal orientation while the dotted line is a frequency response curve of an comparative embodiment of earphone that comprises an FIR sensor arranged in a vertical orientation.

FIG. 6 shows a frequency response curve chart, wherein the solid line in the chart shows a frequency response curve of an earphone according to one or more embodiments of the present disclosure that comprises an FIR sensor arranged in a horizontal orientation while the dotted line shows a frequency response curve of an comparative embodiment of earphone that comprises an FIR sensor arranged in a vertical orientation. As shown in FIG. 6, the earphone according to one or more embodiments of the present disclosure has a better frequency response performance, especially in the frequency range higher than 6 k Hz or lower than 50 Hz. Generally, the frequency response curve of the earphone according to the present disclosure (solid line) is about 5-15 dB higher than that of the comparative embodiment (dotted line) in the frequency range from 6 k to about 15 k.

The present disclosure is described in connection with a TWS earbud, however, the present disclosure is not limited thereto, and the present disclosure may be applied to any kind of suitable earphones, such as an in-ear earphone or a semi-in-ear earphone. In the embodiments shown in the FIGS. 1, 2A-2C, 5A-5B, the FIR sensor assembly comprises a flexible PCB and a single chip FIR sensor mounted on the flexible PCB. However, the present disclosure is not limited thereto. In some embodiments, the FIR sensor assembly may include a rigid PCB and a single chip FIR sensor mounted on the PCB. In some embodiments, the present disclosure may adopt any suitable temperature sensor, such as an IR sensor. In the embodiments shown, the reflector comprises a shaped inner surface in the ear tube and a coating applied to the inner surface. However, the present disclosure is not limited thereto. In some embodiments, the reflector may be a separate part that may mounted in the audio channel of the earphone. In the embodiments shown, the temperature sensor is arranged in a horizontal orientation in which the photo surface of the temperature sensor is substantially parallel to an axis x of the audio channel. However, the present disclosure is not limited thereto, and the temperature sensor may be arranged in other orientation in which the photo surface of the temperature sensor is at an angle to the axis x of the audio channel.

According to some embodiments of the disclosure, the present disclosure can be implemented as follows.

Item 1: an earphone, comprising:
a housing defining an audio opening, the audio opening is configured to be positioned within or facing toward an ear canal of a wearer in an wearing position of the earphone;
a speaker driver positioned within the housing, the speaker driver comprising a diaphragm facing toward the audio opening, defining an audio channel between the diaphragm and the opening;
a body temperature measuring module positioned within the audio channel, the body temperature measuring module comprising a reflector and a temperature sensor, the temperature sensor is configured to receive an infrared light transmitted through the audio opening and reflected by the reflector.

Item 2: the earphone according to Item 1, wherein the body temperature measuring module further comprises an optical filter at or near the audio opening.

Item 3: the earphone according to any of Items 1-2, wherein the optical filter is configured to allow IR light of selected wavelength to pass through while substantially absorbs light of other wavelength.

Item 4: the earphone according to any of Items 1-3, wherein the reflector comprises a shaped inner surface of the housing and a coating applied to the shaped inner surface.

Item 5: the earphone according to any of Items 1-4, wherein the coating is a silver coating.

Item 6: the earphone according to any of Items 1-5, wherein the shaped inner surface and the coating is of a curved surface and is configured to reflect and converge the infrared light onto the temperature sensor.

Item 7: the earphone according to any of Items 1-6, wherein the temperature sensor is an FIR sensor.

Item 8: the earphone according to any of Items 1-7, wherein the temperature sensor is arranged in a horizontal orientation in which the photo surface of the temperature sensor is substantially parallel to an axis of the audio channel.

Item 9: the earphone according to any of Items 1-8, wherein the temperature sensor is mounted on a flexible PCB.

Item 10: the earphone according to any of Items 1-9, wherein the temperature sensor is a single chip FIR sensor.

Item 11, the earphone according to any of Items 1-10, wherein the earphone is an in-ear earphone or TWS earphone.

Systems and methods have been described in general terms as an aid to understanding details of the disclosure. In some instances, well-known structures, materials, and/or operations have not been specifically shown or described in detail to avoid obscuring aspects of the disclosure. In other instances, specific details have been given in order to provide a thorough understanding of the disclosure. One skilled in the relevant art will recognize that the disclosure may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the disclosure. Accordingly, the disclosure is not to be restricted except in light of the attached claims and their equivalents.

The invention claimed is:

1. An earphone, comprising:
a housing defining an audio opening, the audio opening configured to be positioned within or facing toward an ear canal of a wearer in a wearing position of the earphone;
a speaker driver positioned within the housing, the speaker driver comprising a diaphragm facing toward the audio opening, defining an audio channel between the diaphragm and the opening; and
a body temperature measuring module positioned within the audio channel, the body temperature measuring module comprising a reflector and a temperature sensor, the temperature sensor configured to receive an infrared light transmitted through the audio opening and reflected by the reflector.

2. The earphone according to claim 1, wherein the body temperature measuring module further comprises an optical filter at or near the audio opening.

3. The earphone according to claim 2, wherein the optical filter is configured to allow IR light of a selected wavelength to pass through while substantially absorbing light of other wavelengths.

4. The earphone according to claim 1, wherein the reflector comprises a shaped inner surface of the housing and a coating applied to the shaped inner surface.

5. The earphone according to claim 4, wherein the coating is a silver coating.

6. The earphone according to claim 4, wherein the shaped inner surface and the coating is of a curved surface and is configured to reflect and converge the infrared light onto the temperature sensor.

7. The earphone according to claim 1, wherein the temperature sensor is an FIR sensor.

8. The earphone according to claim 1, wherein the temperature sensor is arranged in a horizontal orientation in which the photo surface of the temperature sensor is substantially parallel to an axis of the audio channel.

9. The earphone according to claim 1, wherein the temperature sensor is mounted on a flexible PCB.

10. The earphone according to claim 1, wherein the temperature sensor is a single chip FIR sensor.

11. The earphone according to claim 1, wherein the earphone is an in-ear earphone or TWS earphone.

12. An earphone, comprising:
  a housing defining an audio opening, the audio opening configured to be positioned within or facing toward an ear canal of a wearer in a wearing position of the earphone;
  a speaker driver positioned within the housing, the speaker driver comprising a diaphragm facing toward the audio opening, defining an audio channel between the diaphragm and the opening; and
  positioned within the audio channel, at least the following: a reflector and a temperature sensor, the temperature sensor positioned to receive an infrared light transmitted through the audio opening and reflected by the reflector.

13. The earphone according to claim 12, wherein further positioned within the audio channel is an optical filter at or near the audio opening.

14. The earphone according to claim 13, wherein the optical filter is structured to allow IR light of a selected wavelength to pass through while substantially absorbing light of other wavelengths.

15. The earphone according to claim 12, wherein the reflector comprises a shaped inner surface of the housing and a coating applied to the shaped inner surface.

16. The earphone according to claim 15, wherein the coating is a silver coating.

17. The earphone according to claim 15, wherein the shaped inner surface and the coating is of a curved surface and is configured to reflect and converge the infrared light onto the temperature sensor.

18. The earphone according to claim 12, wherein the temperature sensor is an FIR sensor.

19. The earphone according to claim 12, wherein the temperature sensor is arranged in a horizontal orientation in which the photo surface of the temperature sensor is substantially parallel to an axis of the audio channel.

20. The earphone according to claim 12, wherein the temperature sensor is mounted on a flexible PCB.

* * * * *